July 28, 1959 G. W. FORMAN ET AL 2,896,444
GRAIN PROBE
Filed May 26, 1955

INVENTORS.
George W. Forman
Ralph D. George
BY
ATTORNEY.

United States Patent Office 2,896,444
Patented July 28, 1959

2,896,444

GRAIN PROBE

George W. Forman, Prairie Village, Kans., and Ralph D. George, Raytown, Mo., assignors to Butler Manufacturing Company, Kansas City, Mo., a corporation of Missouri Application May 26, 1955, Serial No. 511,216

7 Claims. (Cl. 73—425.2)

This invention relates to probes for obtaining samples of grain from large loads thereof and refers more particularly to such a probe which permits precise and accurate sampling of grain at any desired depth.

Grain probes of various types are well known in the art and in industry. Conventional probes generally comprise a double-tube unit having a series of longitudinally spaced openings in both tubes. The inner tube can be rotated to close off the openings and it is in this condition that the probe is inserted into the bed of grain; then the inner tube is turned to permit the grain to enter the probe through the openings after which it is again turned to close them off while the probe is withdrawn. The sample thus obtained can be removed from the probe by unscrewing its tip. Conventional probes of this character have two shortcomings. First, in the course of inserting the probe into the grain or withdrawing it from the grain, the inner tube may be accidentally turned so as to uncover the entrance opening; in other words, it is difficult for the operator to know at any given time when the probe is buried whether the openings are closed or not and, accordingly, there is some uncertainty as to whether the desired representative sample of grain was obtained just where the operator desired to obtain it. Second, a probe of the conventional type is suitable for use only in obtaining a sample for a predetermined distance below the surface of the grain bed. If a sample is desired deep down in the bed, it is necessary to employ a different type of probe. Two probes, one for deep and one for shallow sampling thus are required.

Therefore, an object of the present invention is to provide a grain probe wherein the operator always knows whether the sample openings are open or closed and also has precise control over opening or closing said openings whereby a grain sample may be obtained from the exact depth desired.

Another object of the present invention is to provide a grain probe wherein the length thereof is readily adjustable to get samples from any desired depth, shallow or deep, with the same probe.

Another object of the present invention is to provide a grain probe comprising a double tube unit wherein the tubes move relative one another only axially to open or close the sampling openings and means are provided to maintain the tubes in closed position except on positive action of the operator.

Other and further objects will appear in the course of the following description of the invention.

In the drawings, which form a part of the instant specification and are to be read in conjunction therewith, an embodiment of the invention is shown and, in the various views, like numerals are therefore used to indicate like parts.

Figure 1:
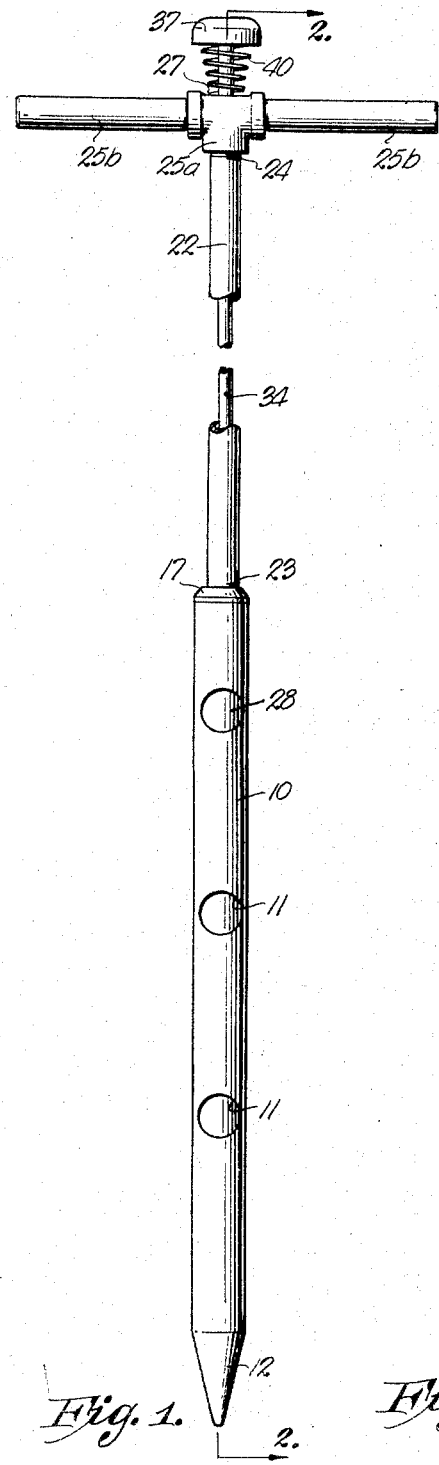
Fig. 1 is a front elevation of a grain probe embodying the invention.
Figure 2:
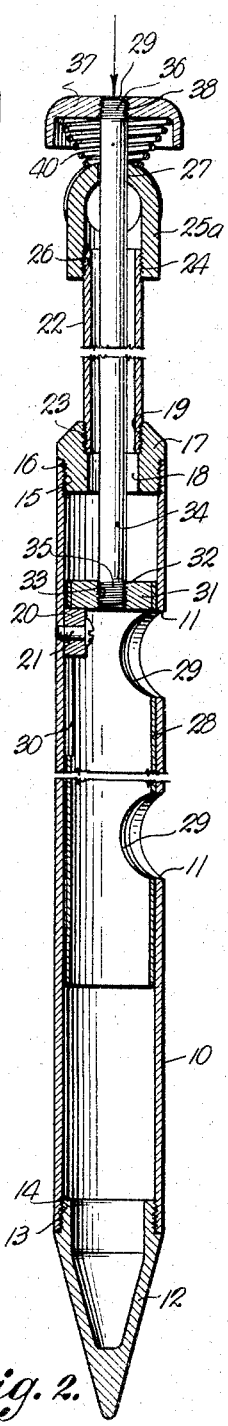
Fig. 2 is a view taken along the lines 2—2 in the direction of the arrows of Fig. 1.
Figure 3:
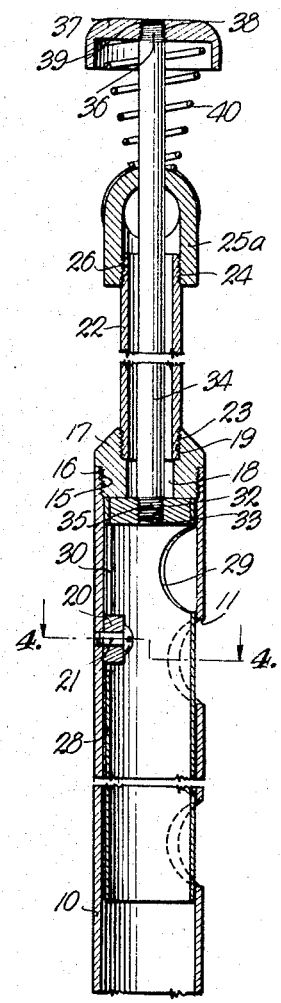
Fig. 3 is a side sectional view similar to the top portion of Fig. 2 with parts arranged corresponding to a different portion of the operating cycle.
Figure 4:
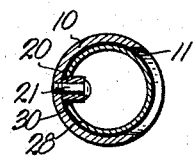
Fig. 4 is a view taken along the lines 4—4 of Fig. 3 in the direction of the arrows.

Referring to the drawings, the grain probe has a cylindrical outer shell 10 with a plurality of vertically aligned grain receiving opennigs 11. A single opening would serve the purpose but a plurality is preferable. The distance between the holes is equal to or greater than the diameter of the holes. Shell 10 has conical tip 12 threaded 13 to fit lower threads 14 on the shell casing. Tip 12 may be unscrewed from shell 10 to empty it. Upper threads 15 on shell 10 engage threads 16 on shell top 17 which has guideway 18 therein threaded 19 at the upper end thereof. Guideblock 20 is attached to inner wall of shell 10 and is preferably angularly displaced from openings 11. Bolt 21 secures block 12 to shell 10. Hollow shaft 22 has lower threads 23 to engage threads 19 of shell top 17. Shaft 22 also has upper threads 24 to be engaged by grip 25 having threads 26 or another counter-threaded section of hollow shaft (not shown). Grip 25 has joint 25a and handles 25b threaded thereto. Joint 25a has hole 27 in the top thereof. Inner tube 28 is concentric to outer shell 10 and has matching plurality of openings 29 therein of a number and spacing to match the openings 11 when aligned therewith.

It should be noticed that the distance between the top 17 and the top of the highest hole 11 is equal to or greater than the diameter of the top opening 29 plus the length of the tube section 28 thereabove. The length of the tube 28 below the lowest opening 29 is great enough to close off the lowest opening 11 when the top edge of the tubing abuts shell top 17. Slot 30 is formed in tubing 28 to engage block 20 whereby movement of tube 28 is only axial relative shell 10. Plug 31 seals the top of tubing 28 and has hole 32 with threads 33 therein. Bar 34 with lower threads 35 and upper threads 36 is fixed to plug 31 and extends upwardly through shell top 17, hollow shaft 22 and joint 25a. When the top edge of tubing 28 abuts shell top 17, bar 34 extends above grip 25 a distance at least equal to the diameter of the holes 11 and 29. Cup 37 may be fixed to threads 36 by threads 38 in opening 39 or an extra bar section (not shown) may be fitted thereon if an extension to hollow shaft 22 is employed. Resilient means 40 extend between the inside of cup 37 and joint 25a and tend to maintain the top of tubing 28 abutting the shell top 17 whereby the openings 11 are closed by the tubing 28.

In operation, the grain probe, with openings 11 closed by tubing 28 and bar 34 extending out of grip 25 as in Fig. 1, is thrust into the grain to the desired depth. Cup 37 is then depressed against joint 25a and action of spring 40 thereby matching openings 29 and 11 and permitting grain to enter the sample chamber cell 10. The pressure against the cup 37 is then released and the tubing 28 moves upwardly under the spring action to abut shell top 17 thereby sealing the sample chamber. The probe with the grain sample is then withdrawn and tip 12 unscrewed to empty the chamber.

To permit sampling at greater depth cup 37 is unscrewed, spring 40 removed and grip 25 unscrewed from hollow shaft 22. Proportioned extra length sections may then be threaded to bar 34 and shaft 22. The grip 25, spring 40 and cup 37 are then threaded to the new sections and the probe is ready for deeper sampling.

From the foregoing it will be seen that this invention is one well adapted to obtain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. A grain sample collecting device comprising a collecting chamber having a cylindrical outer shell having a plurality of vertically aligned grain receiving openings therein, a guide block attached to the inner wall of said outer shell and angularly displaced from said grain receiving openings, an inner tube concentric to said outer shell, a plurality of vertically aligned grain receiving openings therein of a number and spacing to match the openings in said outer shell when aligned therewith, and a slot in said inner tube wall to receive said guide block whereby movement of said tube is axial only and the tube and shell openings are maintained in line, a hollow handle attached to the top of said shell, gripping means on the top of said handle, a shaft in said handle of greater length than the handle, said shaft being attached to the upper end of the inner tube, a knob attached to the upper end of said shaft and resilient means between said knob and said grip urging the knob away from said grip.

2. A grain probe comprising a sample chamber having an outer enclosing probe shell with a plurality of outer grain receiving perforations therein, said outer perforations vertically displaced one from another, an inner concentric tube having matching inner grain receiving perforations therein, the vertical distances between corresponding perforations in said shell and said tube being equal and the vertical distances between corresponding perforations in said shell and tube also being at least equal to the greatest diameter of said holes, positioning means cooperating between said shell and said tube whereby the tube is movable only axially relative said shell, handle means attached to the upper end of said probe shell, and means cooperating with said handle to displace said tube axially to match and unmatch said outer and inner perforations to permit receiving of grain samples in said probe shell.

3. A grain probe comprising a sample chamber having an outer enclosing probe shell having a plurality of outer grain receiving perforations vertically displaced one from another therein and an inner concentric tube having matching inner grain receiving perforations therein, the vertical distances between corresponding perforations in the shell and tube being equal and the vertical distance between corresponding perforations in the shell and tube also being at least equal to the greatest diameter of said holes, positioning means cooperating between said shell and said tube whereby said tube is movable only axially relative to said shell, a hollow handle attached to the upper end of said probe, and a tube shaft attached to the upper end of said tube and extending through said handle and movable to displace said tube axially to match and unmatch said outer and inner perforations to permit receiving of grain samples in said probe shell, said tube shaft having an operating length greater than the handle shaft at least by a distance greater than the diameter of said perforations.

4. A grain probe comprising a sample chamber having an outer enclosing probe shell closed at one end, an outer grain receiving opening in said probe shell, an inner concentric tube within said shell, an inner grain receiving opening in said tube to match said outer opening in said shell, positioning means cooperating between said shell and tube whereby said tube is movable only axially relative said shell, a hollow handle attached to the upper end of said shell, means connected to said tube and extending through said handle for displacing said tube axially to match and unmatch said outer and inner openings to permit receiving of grain samples in said probe shell, means at the handle end of the shell to limit travel of the tube relative thereto, the opening in said shell being positioned below the tube travel limiting means a distance at least equal to the diameter of said opening, the skirt of said tube extending below the lower edge of the opening in said tube at least a distance equal to the diameter of said opening and the extension of the tube above its opening whereby when the top of said tube abuts the tube travel limiting means, the opening in said shell is closed off by the skirt of said tube.

5. Apparatus as in claim 4 wherein said means cooperating between the shell and tube for positioning the tube relative said shell for axial movement relative thereto comprises a slot in the wall of the tube and a stud on the inner wall of said shell, the stud engageable within said slot.

6. Apparatus as in claim 5 wherein the length of the slot in the tube wall is equal to or greater than the diameter of said grain receiving opening plus the diameter of said stud.

7. Apparatus as in claim 4 including means operating to normally maintain the tubing in such a position relative the shell that the tubing hole is displaced from the shell hole whereby said shell hole is normally closed by the tubing wall.

References Cited in the file of this patent

UNITED STATES PATENTS

| | | |
|---|---|---|
| 176,038 | Nelson | Apr. 11, 1876 |
| 185,024 | Gent | Dec. 5, 1876 |
| 703,233 | Brown | June 24, 1902 |
| 1,152,133 | Wareham | Aug. 31, 1915 |
| 1,229,273 | James et al. | June 12, 1917 |
| 1,761,298 | Harris | June 30, 1930 |